Figure 1:
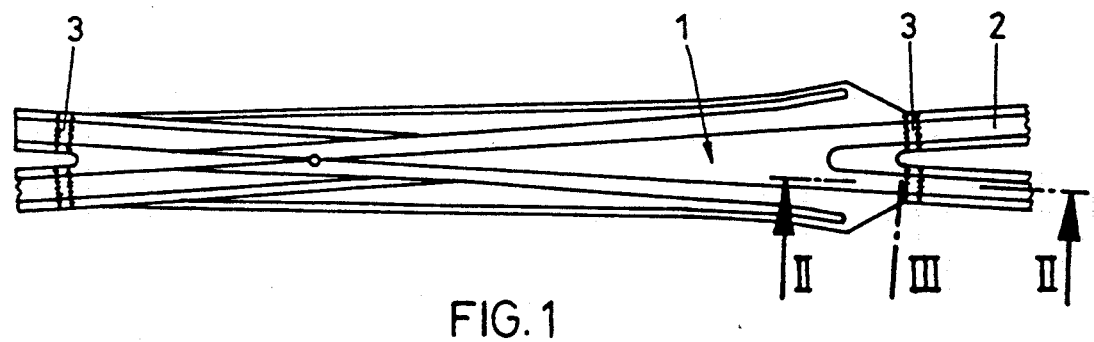

「United States Patent [19]

Blumauer

[11] Patent Number: 5,170,932
[45] Date of Patent: Dec. 15, 1992

[54] METHOD FOR CONNECTION OF RAILWAY POINT COMPONENTS CONSISTING OF CAST HARD MANGANESE STEEL OR MANGANESE STEEL RAILS TO A RAIL MADE FROM CARBON STEEL

[75] Inventor: Johannes Blumauer, Zeltweg, Austria

[73] Assignee: Voest-Alpine Eisenbahnsysteme Gesellschaft m.b.H., Vienna, Austria

[21] Appl. No.: 731,051

[22] Filed: Jul. 15, 1991

[30] Foreign Application Priority Data

Jul. 20, 1990 [AT] Austria ................. 1534/90

[51] Int. Cl.⁵ ............................................. B23K 31/02
[52] U.S. Cl. ................................ 228/189; 228/263.15; 228/182; 148/529
[58] Field of Search ............... 228/189, 231, 263.13, 228/263.15; 148/127

[56] References Cited

U.S. PATENT DOCUMENTS

| | | | |
|---|---|---|---|
| 3,052,016 | 9/1962 | Zimmer | 228/189 X |
| 3,865,639 | 2/1975 | Bellot et al. | 148/127 |
| 4,144,442 | 3/1979 | Augustin et al. | 219/106 |
| 4,169,745 | 10/1979 | Moser et al. | 148/127 |
| 4,514,235 | 4/1985 | Augustin et al. | 420/106 X |
| 4,724,890 | 2/1988 | Moser et al. | 228/198 X |
| 5,042,755 | 8/1991 | Testart | 29/446 X |

FOREIGN PATENT DOCUMENTS

| | | |
|---|---|---|
| 0070774 | 1/1983 | European Pat. Off. . |
| 0181251 | 5/1986 | European Pat. Off. . |
| 0260233 | 3/1988 | European Pat. Off. . |
| 2239304 | 2/1974 | Fed. Rep. of Germany . |
| 2646056 | 5/1977 | Fed. Rep. of Germany . |
| 2706697 | 7/1978 | Fed. Rep. of Germany . |
| 2834282 | 2/1979 | Fed. Rep. of Germany . |
| 3004235 | 8/1981 | Fed. Rep. of Germany . |
| 52-00741 | 1/1977 | Japan .................. 228/263.15 |

Primary Examiner—Richard K. Seidel
Assistant Examiner—Patty E. Hong
Attorney, Agent, or Firm—Cushman, Darby & Cushman

[57] ABSTRACT

In a method for connection of railway point components (1) such as, for example, frogs consisting of austenitic cast hard manganese steel, or manganese steel rails, to rails (2) made from carbon steel, with the utilization of an intermediate piece (3) made from low-carbon austenitic steel, in which method the intermediate piece (3) is first-of-all welded to the standard rail or connecting rail (2), following which, after cutting off the intermediate piece (3) to a length of less than 25 millimeters, in a second welding operation, the intermediate piece (3) is welded to the component (1) consisting of cast hard manganese steel or to the manganese steel rail (1), an intermediate piece (3) consisting of a low-carbon, austenitic, steel, in particular a chromium-nickel-steel, stabilized with niobium and/or titanium, is utilized and, following the first welding operation, a heat treatment, in particular a diffusion-solution at a temperature between 350° C. and 1000° C., is carried out.

5 Claims, 1 Drawing Sheet

METHOD FOR CONNECTION OF RAILWAY POINT COMPONENTS CONSISTING OF CAST HARD MANGANESE STEEL OR MANGANESE STEEL RAILS TO A RAIL MADE FROM CARBON STEEL

The present invention relates to a method for connection of railway point components, for example frogs, consisting of austenitic cast hard manganese steel, or manganese steel rails, to rails made from carbon steel, with the utilisation of an intermediate piece made from low-carbon austenitic steel, in which method the intermediate piece is first-of-all welded to the rail or connecting rail, following which, after cutting off the intermediate piece to a length of less than 25 millimeters, in a second welding operation, the intermediate piece is welded to the component consisting of cast hard manganese steel or to the manganese steel rail.

A method of the type referred to initially has become known from the Austrian Patent Specification AT-PS 350 881. According to this known method, following a flash butt welding, by means of which the intermediate piece was connected to the standard rail, the intermediate piece was cut off to a length of 20 to 25 millimeters at the most, preferably 18 to 20 millimeters, following which a further flash butt welding was undertaken for connecting the intermediate piece with the cast hard manganese steel component. Following the second welding operation, there was a more rapid cooling operation than that following the first welding operation where, by means of the slower cooling, a hardening of the rail steel was to be avoided. The relatively short intermediate piece it is to take into account the condition that austenitic steels are generally less resistant to abrasion that the material of the frog so that, by keeping the intermediate piece very short, any risk of dents forming in the bearing surfaces of the intermediate piece is avoided. However, because of the fact that such a short intermediate piece is desirable, during the second welding operation, owing to the shortness of the intermediate piece, the first weld seam between the rail and the intermediate piece is heated to a note-worthy extent. However, the heating occurs to temperatures of approximately 700° C. and, starting out from a temperature of this magnitude, embrittlement is no longer to be feared, even when cooling takes places in still air, without it being necessary to introduce any delaying action. The utilisation of the intermediate piece in this situation fundamentally serves to separate the two welding sites from the thermal point of view in order to be able to adhere to the particular required cooling conditions. Possible embrittlement of the cast hard manganese steel of the frog is, to a substantial degree, able to be attributed to the fact that, by diffusion at the welding site, a mixed zone arises in which an unfavourable structural formation can develop.

It has already been proposed in the German Patent Specification DE-PS 29 52 079 the welded connection referred to, between the working components consisting of austenitic cast hard manganese steel and rails made from carbon steel, with the utilisation of an intermediate piece made of austenitic material, should be carried out in such a manner so that the intermediate piece is first-of-all welded to the hard manganese steel by flash butt welding, following which the working piece is subjected to a heat treatment, consisting of a solution heat treatment and a quenching in water, subsequent to which the connection to the standard rail steel is effected by flash butt welding in such a manner that the hard manganese steel is cooled at the same time and the connection to the standard rail is cooled with a delay so that a transformation to finely-striated perlite is achieved. In this additional, already-proposed, method it was proposed to use, as especially preferred, a nickel-based alloy as the working material for the intermediate piece. In the case of utilisation of austenitic steels, it was proposed to use conventional chromium-nickel-steels as well as manganese alloyed chromium-nickel-steels as the working materials for the intermediate piece.

The objective of the present invention is thus to develop thoroughly the method of the type referred to initially in such a manner that the second welding operation can be carried out with out the need to maintain special cooling parameters while, at the same time, improved fatigue strength and a more homogeneous structural formation throughout the entire welding zone is achieved. In particular, dispensing with a heat treatment after the second welding operation to the standard rail steel is intended to improve the reproducibility of the mechanical strength properties of the welded joint and, at the same time, improved load-deflection strength and fatigue strength are to be achieved. In order to solve these problems, the fundamental nature of the method in accordance with the present invention is such that an intermediate piece consisting of a low-carbon, austenitic, steel, in particular a chromium-nickel-steel, stabilised with niobium and/or titanium, is utilised and, following the first welding operation, a heat treatment, in particular a diffusion-solution at a temperature between 350° C. and 1000° C., is carried out. Because of the fact that an intermediate piece consisting of a low-carbon, austenitic, steel, in particular a chromium-nickel-steel, stabilised with niobium and/or titanium, is utilised, the content of free carbon is reduced and the diffusion of carbon which, has a negative influence on the mechanical characteristic values of the welded joint, is restricted. Because of the fact that, as the result of this first flash butt welding between the carbon steel of a rail and the intermediate piece, a positively directed heat treatment is undertaken, an equalisation of the concentration differences of the completely different alloys of the intermediate piece and the rail steel is achieved by diffusion and, at the same time, not only is an equalisation of concentrations in the welding zone achieved, but also any martensite, which might possibly have been formed, undergoes decomposition. After the cutting-off of the intermediate piece to the shortest length required for the second welding operation, the connection to the component consisting of cast hard manganese steel or to a manganese steel rail can be effected, can once again be effected by flash butt welding and where, subsequently, there are no special conditions to be maintained for the cooling. The second weld can be allowed to cool down in still air, which corresponds to a preferred form of embodiment, without it leading to new, undesired, hardening phenomena in the region of the first welded connection. Overall, load-deflection values, for the total welded connection, are achieved with such a method of operation, which are up to twice as high as those load-deflection values which may be achieved with the use of known methods of operation and where, at the same time, fatigue-strength values of up to 250 N/mm² can be achieved without any difficulty.

The heat treatment is advantageously carried out over a period of 2 to 5 hours, which guarantees that the danger of martensite formation can be eliminated with certainty. The formation of martensite, even with positively directed operation of the method, cannot be avoided with certainty during the first welding operation and, in particular, with delayed cooling after said first welding operation where, by means of the positively directed heat treatment along with the elimination of any martensite which could possibly have formed, the concentration profile of the chemical elements in the welding region is equalised to the greatest possible extent, because of which the higher values for mechanical strength and load deflection are the result.

In a particularly advantageous manner, the heat treatment method is carried out in such a way that the heat treatment extends over a period of time from 2 to 5 hours, after which the cooling is allowed to take place in still air.

Based upon the homogenisation of the concentration distributions in the welding region which can be achieved by the heat treatment after the first butt welding operation, and based upon the condition that any martensite which could possibly have been formed has been reliably eliminated, it is possible, according to a further preferred development of the method in accordance with the present invention, to proceed subsequently in such a way that, after the second welding operation, the cooling is effected in still air.

It is an advantage to utilise steels for the intermediate piece of the quality X10CrNiTi 18 9, X10CrNiTi 18 10, X10CrNiNb 18 9 or X10CrNiNb 18 10. These types of niobium or titanium stabilised steels possess a maximum content of 0.06 percent by weight of carbon, in which case titanium or niobium for stabilisation are used in such amounts which, in the case of titanium is at least five times the amount of the carbon content and, in the case of niobium, it is at least ten times the amount of the carbon content. Here it has been found particularly advantageous if the intermediate piece has the following analytical composition:

|    | C  | 0.06 max    |
|----|----|-------------|
|    | Cr | 17.5        |
|    | Ni | 9.5         |
|    | Ti | $>5 \times C$ |
| or | Nb | $>10 \times C$ | with the remainder being iron and usually-associated elements.

With the utilisation of the material proposed in accordance with the present invention for the intermediate piece and the maintenance of the conditions required for the heat treatment, it is possible for crack formation in the region of the flash butt welded connection to be completely avoided, in which case the resistance to fracture is increased and higher fatigue-strength values, as well as better load-deflection values, can be achieved. Such types of welded connections are able to withstand even the high stresses and loadings of high-speed rail traffic.

With the intermediate piece proposed in accordance with the present invention to be made from hard manganese steel having an analytical composition of carbon 0.95 to 1.30, manganese 11.5 to 14 percent by weight in the cast, rolled or forged condition, as well as rolled hard manganese steel rails of analogous analytical composition, with austenitic intermediate pieces made from steel with the composition X10CrNiNb 18 9, as well as X10CrNiTi 18 9, likewise welded in cast, preferably forged or rolled condition where, in the case of rail steels, standard rails materials in accordance with UIC or head-hardened rails are utilised. The first welding operation between the carbon steel of the rail and the intermediate piece is undertaken here with an intermediate piece having a length of approximately 500 millimeters, whereupon, after the first flash butt welding, the intermediate piece which has already been connected to the standard rail, is cut-off to a length of 8 to 20 millimeters, in order to guarantee that, after the second welding operation of the intermediate piece to the cast hard manganese steel piece or the manganese steel rail, an effective length of the intermediate piece of approximately 5 millimeters remains. Determined by the stabilising of the austenite by the niobium and/or titanium, during the first welding connection, which takes place at substantially higher temperatures than the following heat treatment, the diffusion of carbon is effectively restricted. A comparison between welded connections which can be achieved in accordance with the Austrian Patent Specification AT-PS 350 881 and the operational method in accordance with the present invention, has demonstrated that a substantial increase in the load-deflection values, by utilisation of the operational method in accordance with the present invention, maximally from 18 to 35 millimeters, can be achieved. The fatigue-strength values can be increased from 200 N/mm² to 250 N/mm². At the same time it was possible to work with a smaller supply of heat, by which means the formation of cracks could be considerably reduced. The former usual post-heating of the weld in the welding machine by electrical current pulses could be dispensed with during employment of the method in accordance with the present invention with the utilisation of the intermediate piece stabilised with niobium or titanium, resulting in increased economy of production. After the second welding connection, because of the heat treatment provided, it was possible to effect a more rapid cooling of the welded region, meaning, in particular, that the former usual post-heating procedure could be done without. The overall result is that, in accordance with the present invention, a shorter welding time is required and the welded connection has a longer working life.

Figure 2:
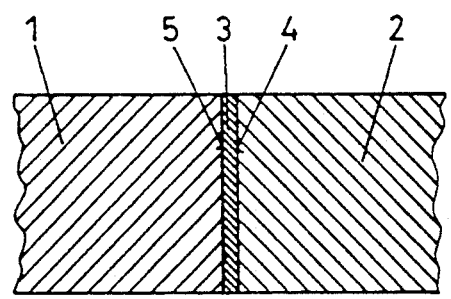
Figure 3:
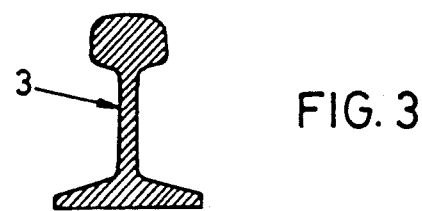

In what follows, the invention will be described in greater detail with reference to an example of embodiment which is represented diagrammatically in the drawing in which:

FIG. 1 is the frog of a cross-over with the attached standard rail made from carbon steel of UIC 860 quality, FIG. 2 is a section on a larger scale along the line II—II in FIG. 1, FIG. 3 is a section along the line III—III in FIG. 1.

The frog 1 consists of cast hard manganese steel. The standard rails 2 are welded to this frog with the interposition of the intermediate pieces 3 by flash butt welding.

Intermediate pieces approximately 50 millimeters long are clamped into a flash butt welding machine (not depicted). The intermediate pieces have the same profile as a standard rail depicted in FIG. 3. These 500 millimeters long intermediate pieces are first-of-all connected to the standard rails 2 by flash butt welding, giving rise to the weld seam 4 as shown in FIG. 2. The region of this weld seam 4 is then subjected to the heat treatment described previously, in order to eliminate any formation of martensite. Following this, the free ends of the intermediate pieces are cut off so that their length measured by starting from the weld seam 4 is approximately 15 millimeters, whereupon the second welding operation to the frog 1, likewise by flash butt welding, is carried out. During this second welding operation, a further short length of 5 to 10 millimeters is burnt off from the intermediate piece, so that the remaining intermediate piece has a length of at least 5 millimeters between weld seam 4 and weld seam 5 (see FIG. 2) which forms the connection between the manganese steel frog 1 and the intermediate piece 2.

I claim:

1. A method for connecting a railway point component, comprising one of a frog formed of austenitic cast hard manganese steel and a manganese steel rail, to a carbon steel rail using an intermediate piece of low-carbon austenitic steel, the method including the steps of:
   (a) welding the intermediate piece to the carbon steel rail;
   (b) heat treating the weld in a diffusion solution, at a temperature between 350° C. and 1000° C. for 2 to 5 hours, and subsequently cooling the weld in still air;
   (c) cutting the intermediate piece to a length less than 25 millimeters;
   (d) welding the intermediate piece to said component; and
   (e) cooling the resulting connection in still air; wherein the intermediate piece is chromium-nickel steel stabilized with at least one of niobium and titanium.

2. The method according to claim 1, characterised in that the heat treatment is carried on for a period of 3 hours at a temperature of approximately 850° C.

3. The method according to claim 8, characterised in the intermediate piece being of the quality of any one of X10CrNiTi 18 9, X10CrNiTi 18 10, X10CrNiNb 18 9 and X10CrNiNb 18 10.

4. The method according to claim 1, characterised in that any niobium content of the steel for the intermediate piece is at least ten times the carbon content and any titanium content is at least five times the carbon content.

5. The method according to claim 4, characterised in that the steel from which the intermediate piece is made has the additional analytical composition:

| | |
|---|---|
| C | 0.06 max |
| Cr | 17.5 |
| Ni | 9.5 | with the remainder being substantially iron.

* * * * *